US011424650B2

(12) United States Patent
Cacheux et al.

(10) Patent No.: US 11,424,650 B2
(45) Date of Patent: Aug. 23, 2022

(54) ROLLING DEVICE ADAPTED TO ROLL ON A GROUND SURFACE

(71) Applicants: Universite Le Havre Normandie, Le Havre (FR); Philippe Cacheux, Montrouge (FR)

(72) Inventors: Philippe Cacheux, Montrouge (FR); Georges Barakat, Montivilliers (FR)

(73) Assignees: Universite Le Havre Normandie, Le Havre (FR); Philippe Cacheux, Montrouge (FR)

( * ) Notice: Subject to any disclaimer, the term of this patent is extended or adjusted under 35 U.S.C. 154(b) by 77 days.

(21) Appl. No.: 17/260,120

(22) PCT Filed: Jul. 12, 2019

(86) PCT No.: PCT/EP2019/068914
§ 371 (c)(1),
(2) Date: Jan. 13, 2021

(87) PCT Pub. No.: WO2020/020673
PCT Pub. Date: Jan. 30, 2020

(65) Prior Publication Data
US 2021/0273508 A1 Sep. 2, 2021

(30) Foreign Application Priority Data
Jul. 24, 2018 (FR) ...................................... 1856876

(51) Int. Cl.
*H02K 1/27* (2022.01)
*H02K 1/2793* (2022.01)
(Continued)

(52) U.S. Cl.
CPC ........... *H02K 1/2793* (2013.01); *H02K 7/088* (2013.01); *H02K 21/12* (2013.01)

(58) Field of Classification Search
None
See application file for complete search history.

(56) References Cited

U.S. PATENT DOCUMENTS

| 6,046,518 A * | 4/2000 | Williams | ............. H02K 5/1737 |
| | | | 310/43 |
| 7,017,694 B2* | 3/2006 | Shirazawa | .............. B60L 50/66 |
| | | | 310/68 B |

(Continued)

FOREIGN PATENT DOCUMENTS

| CN | 112889203 A | * | 6/2021 | ........... E21B 43/128 |
| DE | 102008063788 A1 | | 7/2010 | |

OTHER PUBLICATIONS

International Searching Authority, International Search Report (ISR) and Written Opinion received for International Application No. PCT/EP2019/068914, dated Sep. 18, 2019, 13 pages, European Patent Office, Netherlands.

*Primary Examiner* — Naishadh N Desai
(74) *Attorney, Agent, or Firm* — Alston & Bird LLP

(57) ABSTRACT

A rolling device adapted to roll on a ground surface, including at least one motorized wheel including a circular stator and a circulator rotor. The stator may include a circular slot and a plurality of electromagnetic coils located in the circular slot so that at least two electromagnetic coils are arranged facing one another. The circular motor may include a circular strip having side walls and a free end edge connecting the side walls, as well as a contact surface with the ground, the circular strip including magnetic elements arranged on the side walls thereof. The circular rotor and the circulator stator may be assembled by means of assembly means provided on the circular stator.

19 Claims, 13 Drawing Sheets

(51) Int. Cl.
*H02K 7/08* (2006.01)
*H02K 21/12* (2006.01)

(56) References Cited

U.S. PATENT DOCUMENTS

| | | | |
|---|---|---|---|
| 8,008,817 B2* | 8/2011 | Lamperth | H02K 7/14 310/268 |
| 2002/0011361 A1 | 1/2002 | Richey, III et al. | |
| 2010/0242168 A1 | 9/2010 | Corcoran | |
| 2015/0048696 A1 | 2/2015 | Kobler et al. | |
| 2015/0298537 A1* | 10/2015 | Duhamel | H02K 1/16 301/6.5 |
| 2016/0347166 A1 | 12/2016 | Hays et al. | |

* cited by examiner

Cross-sectional view
A-A

Top view

Perspective view

ROLLING DEVICE ADAPTED TO ROLL ON A GROUND SURFACE

CROSS-REFERENCE TO RELATED APPLICATIONS

This application is a national stage application filed under 35 U.S.C. § 371 of International Application No. PCT/EP2019/068914 filed Jul. 12, 2019, which application claims priority to French Application No. 1856876 filed Jul. 24, 2018, each of which is hereby incorporated by reference in its entirety.

The invention relates to the field of motorised devices including motorised wheels. The invention also relates to any rolling device and more specifically, wheelchairs equipped with motorised wheels.

More generally, the invention relates to any type of rolling device adapted to roll on a ground surface, such as a bike, a motorcycle, a moped, a scooter, a tricycle, a Segway, a car, an aeroplane, a robot, etc.

The motorised wheel design has been known for a long time. The motorised wheel is moved by a motor generally located at a distance from it. This has a circular shape and is mounted on a hub.

The motorised wheel has subsequently undergone developments. The motor initially located outside of the wheel has been integrated in the wheel.

The motorised wheel can be assembled to different supports in order to make the latter mobile. It is thus that motorised wheels adaptable on different supports, such as for example bikes or also wheelchairs, have come about.

Current motorised wheels comprise an electric motor. This motor comprises a stator provided with a series of coils and a rotor mobile with respect to the stator. The rotor is rotated under the effect of a magnetic field induced by the coils of the stator. This movement allows the wheel to be rotated.

Motorised wheels can support and displace a significant load. They must therefore generate a significant, low-speed torque.

Although certain motorised wheels develop a significant torque, a disadvantage is that these remain high consumers of energy. Their efficiency is therefore particularly low and the battery life is highly impacted.

Another disadvantage resides in the dimensions of the wheel. Motorised wheels intended to develop a significant torque are thick so that the engine can be inserted in its central space. These imposing dimensions disqualify these motorised wheels from high power for applications such as bikes or wheelchairs.

Another disadvantage of motorised wheels is that they are equipped with gear reducers, which considerably increases their mass, their production cost, decreases their reliability due to the significant number of parts that these gear reducers comprise, and moreover increases noise in use.

Another disadvantage of these motorised wheels resides in the magnetic elements used. These magnetic elements are generally permanent magnets made with a rare earth base. These rare earth magnets have several disadvantages. The extraction and the utilisation of rare earths have a negative impact on the environment. In addition, the use of rare earth permanent magnets is problematic, since these generate a magnetic force in the absence of an electric current, this due to the residual induction of these magnets which can reach 1.5 Teslas. This is undesired when it is needed to manually rotate the wheel. Indeed, the rotor thus systematically tends to come back to a position of magnetic balance. Despite the use of rare earth magnets, this magnetic return force can be reduced, but this requires a complex arrangement of the magnetic elements, which significantly complexifies the motorised wheels, making them more difficult to product and increasing their costs.

Another disadvantage of motorised wheels resides in the fact that the height of these is fixed. Indeed, the fixing of the wheel to a support such as a wheelchair, for example is done substantially in the vicinity of a zone located in the centre of said motorised wheel. A static fixing of the motorised wheel on its support can be uncomfortable.

The invention aims to overcome at least one of the abovementioned disadvantages for rolling devices. To this end, a rolling device adapted to roll on a ground surface is proposed, comprising at least one motorised wheel and a casing (51) for controlling said at least one motorised wheel (1), said at least one motorised wheel comprising:

a circular stator comprising a body defining a circular slot and comprising a plurality of electromagnetic coils located in the circular slot so that at least two electromagnetic coils are arranged facing one another, and a circular rotor comprising over an inner periphery, a circular strip having side walls and a free end edge connecting the side wall (34), the circulator rotor comprising a contact surface with the ground, said contact surface extending over an outer periphery, and said circular strip comprising magnetic elements arranged on its side walls, the circular rotor and the circular stator being assembled by means of assembly means provided on the circular stator, the circular strip of the circular rotor being arranged in the circular slot of the circular stator so that the magnetic elements of said circular strip are located between the electromagnetic coils of the circular stator.

Various additional features can be provided individually or in combination:

the body of the circular stator comprises two half-stators fixed to one another so that the circular slot is continuous;

each half-stator comprises fixing pads capable of fixing the half-stators to one another, these fixing pads being located on the inner periphery of said half-stators;

the assembly means, below called rotating supports, are arranged on the inner periphery of the circular stator;

the rotating supports are arranged on the fixing pads;

the rotating supports comprise;
    an axis,
    two ball bearings mounted on the axis, and
    a roller mounted on the ball bearings;

the roller comprises a groove intended to receive the circular strip of the circular rotor and the groove is in a cross-section, at least partially, a counterpart of the free end edge;

the magnetic elements of the circular rotor comprise an iron and silicon alloy or ferromagnetic alloy, or permanent magnets without rare earths;

the side walls (34) of the circular strip (45) comprising several openings (35) receiving said magnetic elements (28);

the rolling device comprises adjustment means capable of modifying the inclination of the axis of the rotating supports so as to adjust a distance separating the circular rotor from the circular stator;

the adjustment means capable of modifying the inclination of the axis of the rotating supports are two eccentric bearing forming an interface between the axis and the fixing pads, each eccentric bearing being mounted on either side of the axis;

the device comprises a device for adjusting the position of a point for fixing said at least one motorised wheel, said adjustment device comprising means for fixing to a connection axis;

the device for adjusting the position of the motorised wheel comprises:
 substantially parallel guide rods fixed to the circular stator,
 an electric motor,
 a worm screw coupled with the electric motor,
 a fixing runner comprising the means for fixing to the connection axis, said fixing runner being mechanically coupled with the worm screw and with the guide rods so that the rotation of the worm screw makes possible the displacement of the fixing runner along the guide rods;

the rolling device comprises:
 a microcontroller,
 a power card connected to the microcontroller,
 a battery connected to the power card,
 a battery charger capable of charging the battery, and a computer program is implemented in the microcontroller, said microcontroller being capable of supplying successively the electromagnetic coils of the circular stator to allow the rotating of the circular rotor.

Preferably, the power card can be an electronic power converter.

In particular, a rolling device is proposed, for example a wheelchair, comprising two motorised wheels and a casing for controlling the motorised wheels.

Various additional features can be provided individually or in combination:

the control casing comprises a tilt sensor connected to the microcontroller, the tilt sensor being capable of measuring the base of the rolling device and of providing this measurement at the microcontroller so that said microcontroller modifies the position of the point of fixing the motorised wheel by actuating the electric motor of the device for adjusting the height of the motorised wheel.

More generally, the invention aims for any type of rolling device adapted to roll on a ground surface such as a vehicle intended to transport one or more persons, animals or property or equipment to carry out services on the ground.

In the scope of the present invention, the ground is defined as a rolling surface on which the device is intended to roll. For example, it can be a road or street, a path or trail, a pavement, or a natural terrain not covered with a covering.

The invention in particular aims for motorised vehicles electrically such as bikes, scooters, Segways, compact cars, mopeds, motorcycles, robots. Of course, the invention is not limited to these few examples given as an illustration, but aims more generally for any type of vehicle which could be motorised and intended to be displaced by rolling on the ground surface.

The invention has a favoured application in the field of aeronautics, in particular for aeroplane landing strips or more generally, for any type of vehicle adapted to be displaced on the ground, in particular by means of propellers, that are not able to move back, but are able to be pulled backwards.

Other particularities and advantages of the invention will appear in the description below in relation to the appended drawings, given as non-limiting examples, and wherein.

Figure 1:
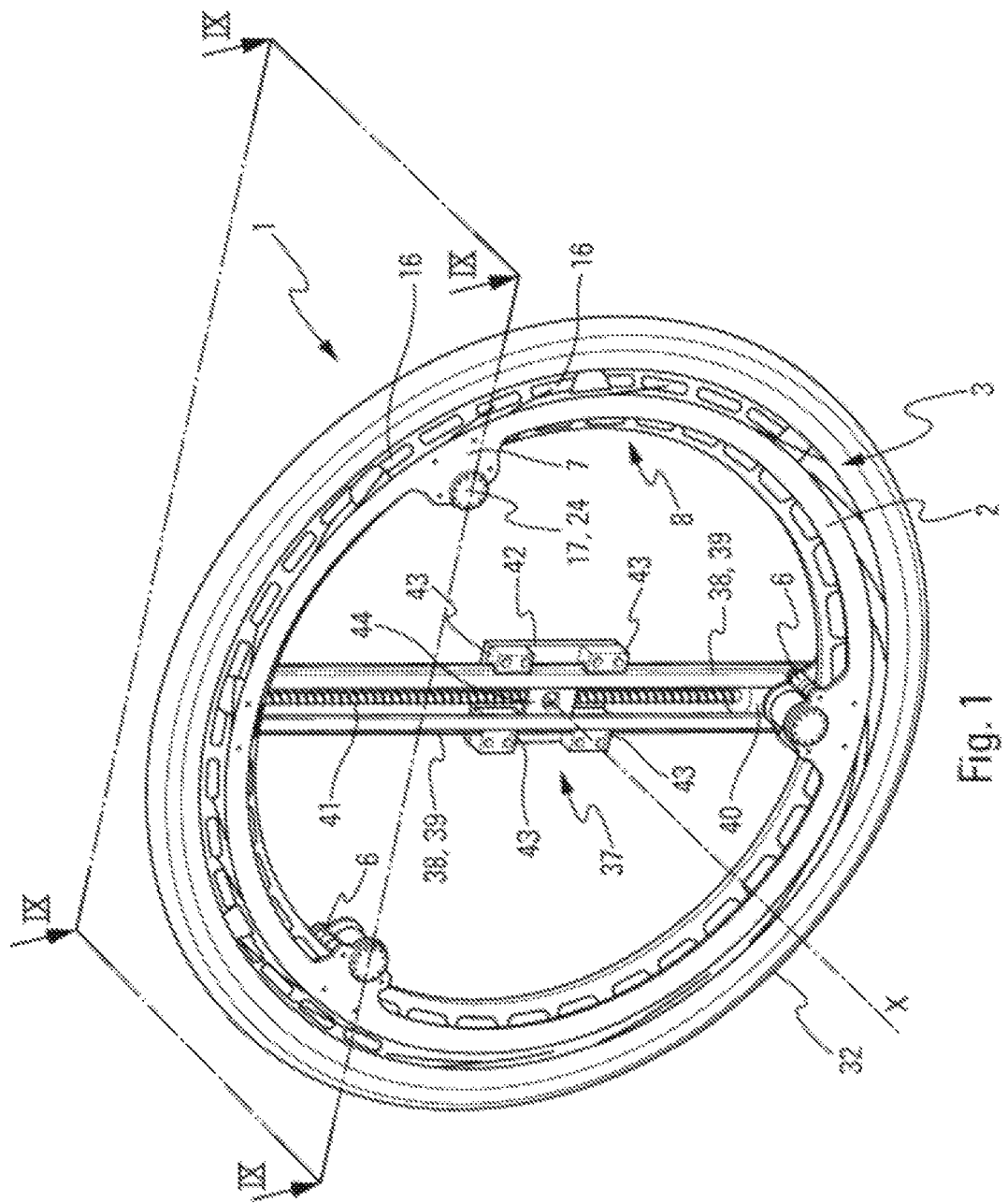
FIG. 1 is perspective view of a motorised wheel according to the invention.

In FIG. 1, a motorised wheel 1 is represented. The motorised wheel 1 comprises a circular stator 2 and a circular rotor 3. The circular stator 2 comprises a body 4. The body 4 is made by the assembly of two half-stators 5. The half-stators are integral with one another, thanks to a plurality of fixing means. Each half-stator 5 comprises fixing pads 7. The fixing pads 7 are located over an inner periphery 8 of the half-stators 5 and these are provided with a fixing orifice 9. On the inner side of the fixing pads 7, the latter comprise an annular housing 10 substantially concentric fixing with the fixing orifice 9. The fixing means are presented in the form of a cylindrical rod 6. The cylindrical rod 6 is arranged between the half-stators 5 and more specifically, between the fixing pads 7 located facing one another. Ends of the fixing rod are housed in the annular housings of the fixing pads 7.

The cylindrical rod 6 comprises a threaded inner orifice 11. On each side of the threaded rod, a screw 12 is inserted through the fixing orifice 9 inside the inner orifice 11 of the cylindrical rod 6. The half-stators 5 are thus integral with one another.

Advantageously, the cylindrical rod 6 has a diameter greater than the fixing orifices 9. This allows the threaded rod to fulfil an additional function, further to making the two half-stators 5 integral. This additional function consists of maintaining the half-stators 5 at a distance from one another. The two half-stators 5 are never in direct contact.

Thus, the body 4 defines a circular slot 13. The circular slot 13 is continuous over the whole periphery of the circular stator 2. In other words, the circular slot 13 defines a 360° circular path without any obstacle. This is made possible in particular thanks to the use of two half-stators 5 to obtain the body 4 of the stator 2.

Each half-stator 5 comprises a plurality of teeth 14. The teeth 14 are arranged on an inner face 15 of the half-stators 5 and project from it. The teeth 14 have a cubic shape or that of a rectangular parallelepiped. The teeth 14 can have a different shape. Thus, the stator comprises a plurality of pairs of teeth 14 distributed over the periphery of the body 4. Each pair comprises two teeth 14 arranged facing one another. In other words, in each pair, a tooth 14 of a half-stator 5 faces the other tooth 14 of the other half-stator 5.

The circular stator 2 comprises electromagnetic coils 16. The coils 16 are mounted on the teeth 14. Thus, the stator comprises as many coils 16 as teeth 14. Just like the teeth 14, the coils 16 of a half-stator 5 are situated opposite the coils 16 of the other half-stator 5.

In the embodiment represented in the figures, the circular stator comprises 36 pairs of electromagnetic coils, that is 72 electromagnetic coils.

According to an embodiment variant, the electromagnetic coils 16 are not distributed over all of the circumference of the half-stators 5 (not represented), but only over one or more portions of the circumference of the stator 2, so as to form one or more coiled segments.

For example, the coils are distributed over one half or only one quarter of the circumference of the half-stators, so as to form a so-called "arched" distribution. Such a distribution of the coils advantageously makes it possible to lighten the structure in terms of weight.

According to a particular embodiment, the coils can be distributed so as to form an alternance of active segments called active arches and non-utilised segments called inactive arches.

Figure 2:
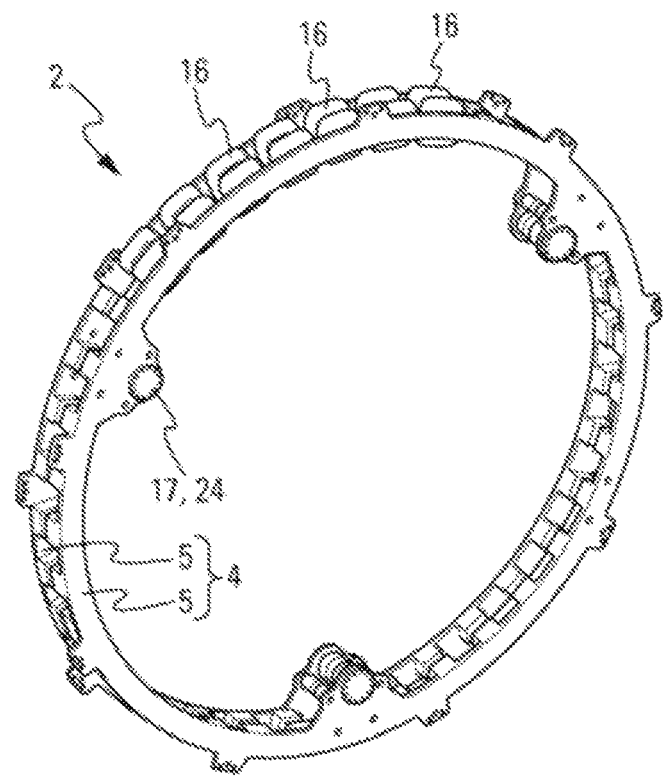
FIG. 2 is a perspective view of a stator of the motorised wheel.

According to the embodiment illustrated in FIG. 2, seven pairs of coils 16 are mounted continuously over the two half-stators 5 by forming one single segment so that the coils of each pair are facing one another.

Figure 7:
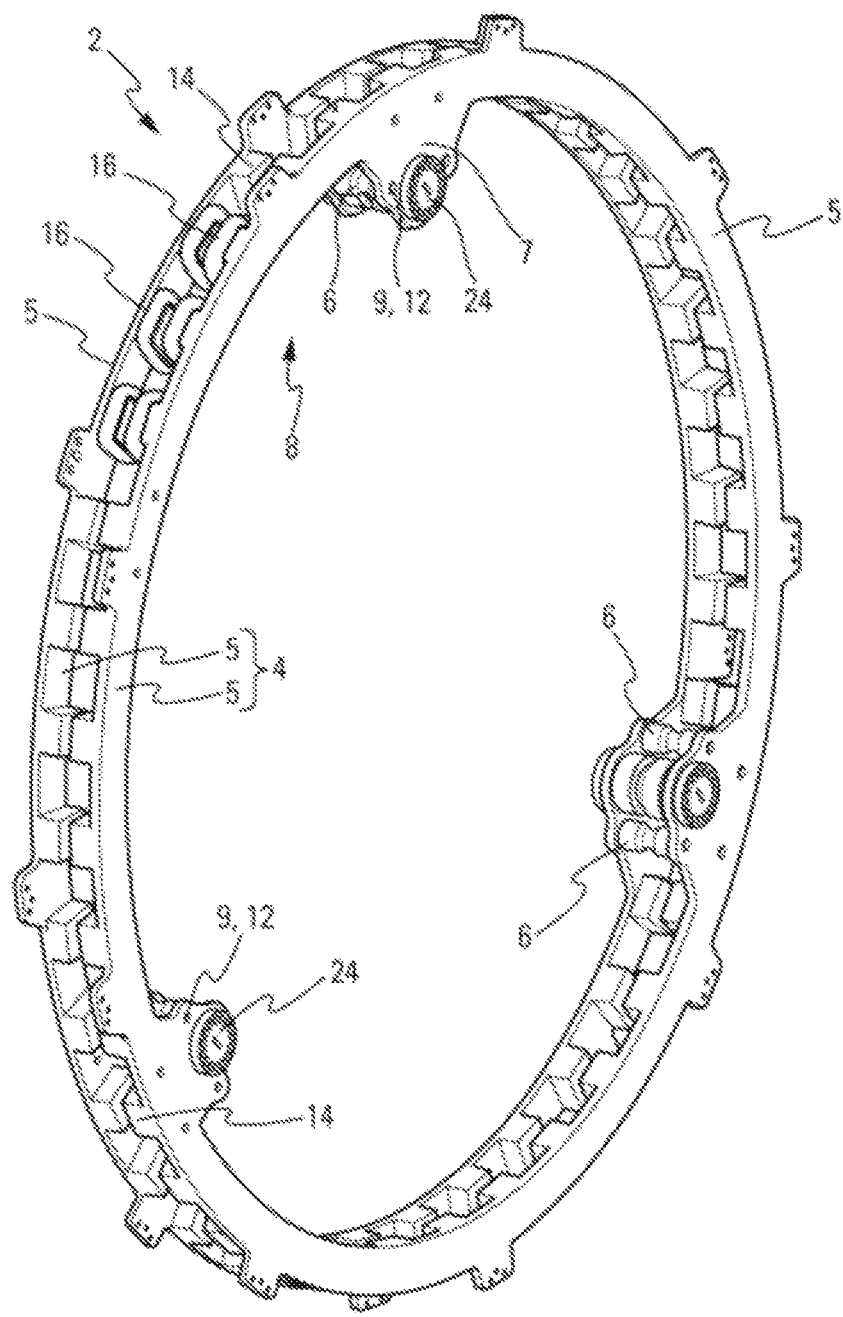
FIG. 7 is a perspective view of the stator according to the invention.

According to the embodiment illustrated in FIG. 7, the two half-stators are assembled mirroring one another, so that each tooth 14 of a half-stator 5 is face-to-face with a tooth 14 of the other half-stator 5.

Figure 6:
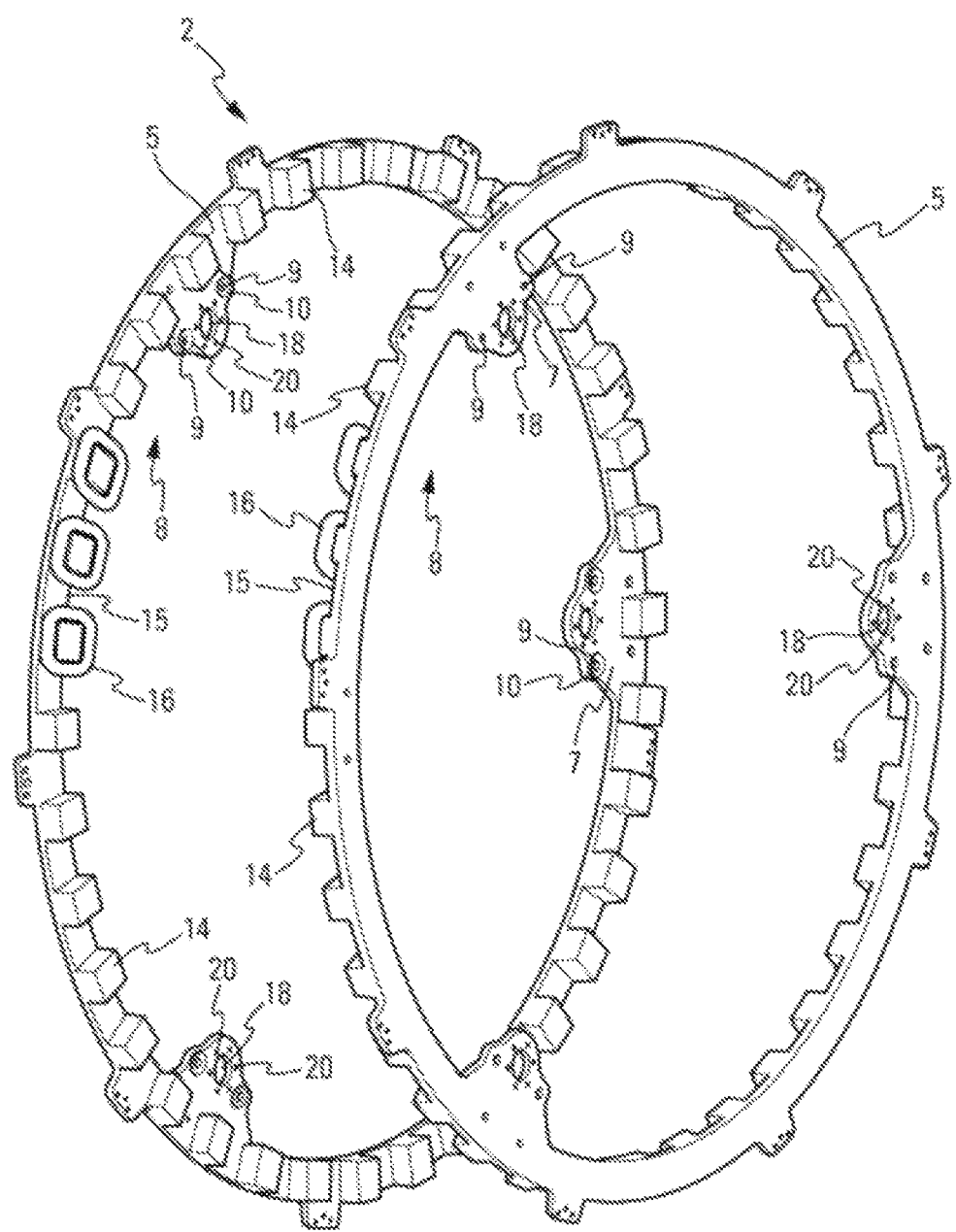
FIG. 6 is an exploded, perspective view of the stator according to the invention.

According to the embodiment illustrated in FIGS. 2, 6, 7, the two half-stators 5 have one same number of teeth. According to another particular embodiment, the two half-stators 5 have a different number of teeth so that they do not form two mirrored twin half-stators. This embodiment of the two half-stators and of the rotor which results from this, makes it possible to reduce the axial attraction force that undergoes the rotor by the action of the two half-stators and to also reduce the potential vibrations of electromagnetic origin.

According to another particular embodiment, the two half-stators 5 are mounted offset against one another, so that the torques exerted by each of the half-stators are opposed.

According to an alternative embodiment (not illustrated), the two half-stators are assembled mirroring one another, but the coils 16 can be mounted offset against one another, so that each of the coils of a half-stator is not face-to-face with a coil fixed on the other half-stator. This embodiment makes it possible to reduce the gearing torque being applied on the rotor due to the variation of the permeance of the air-gap. More specifically, this method makes it possible to oppose the gearing torques on either of the faces of the rotor and therefore to reduce the total gearing torque.

Figure 3:
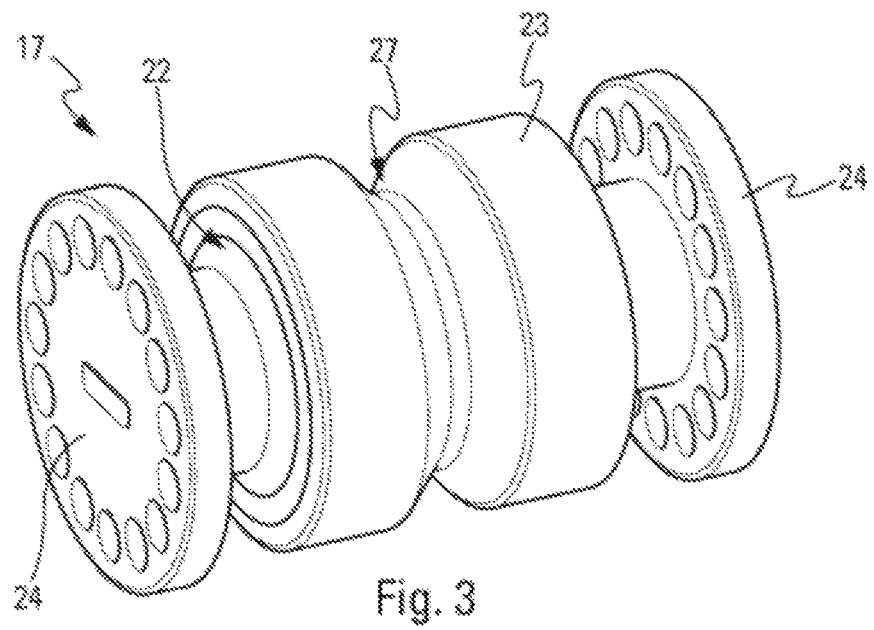
FIG. 3 is a perspective view of a rotating support of the motorised wheel.
Figure 4:
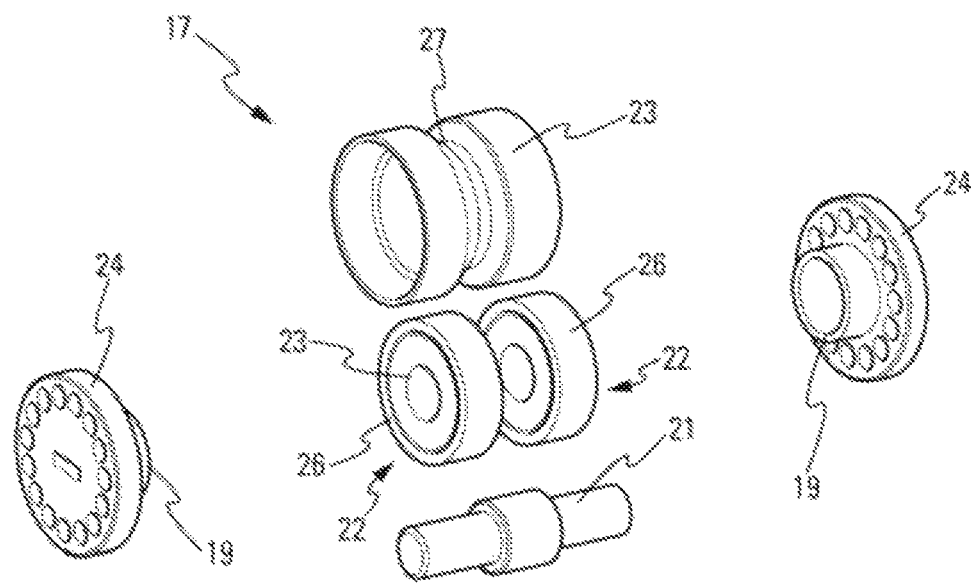
FIG. 4 is an exploded, perspective view of the rotating support of FIG. 3.
Figure 5:
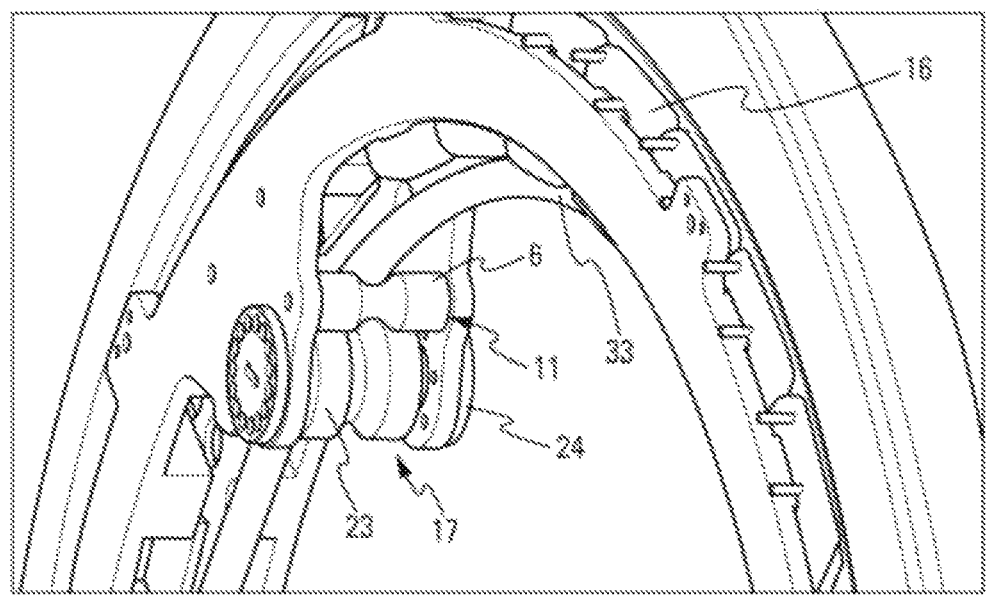
FIG. 5 is an up-close, perspective view of the rotating support of FIGS. 3 and 4, mounted in the motorised wheel.

The stator comprises assembly means, below called rotating supports 17, illustrated in FIGS. 3 to 5. The rotating supports 17 are applied and mounted on the fixing pads 7. To this end, each fixing pad 7 comprises a support orifice 18 intended to receive an end 19 of a rotating support 17. The fixing pad 7 comprises several adjustment orifices 20 made around the support orifice 18. Each rotating support comprises several elements which can be seen in FIG. 4, namely:
- an axis 21 of the support,
- two ball bearings 22 mounted on the axis 21 of the support,
- a roller 23 mounted on the ball bearings 22,
- two eccentric bearings 24 forming an interface between the axis 21 of the support and the fixing pads 7.

An inner ring 25 of the ball bearings is mounted on the axis 21 of the support, while an outer ring 26 is mounted on the roller 23. Thus, the roller 23 can be rotated with respect to the axis 21 of the support. The roller 23 comprises a substantially U-shaped guide groove 27. The rotating support is applied and mounted on two fixing pads 7 located opposite one another, as well as illustrated in FIG. 5.

Figure 14:
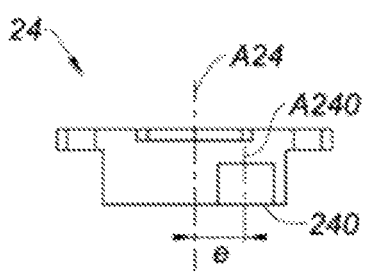
FIG. 14 illustrates an example of an embodiment of an eccentric bearing.
Figure 14:
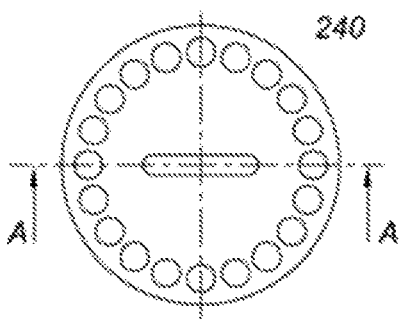
Figure 14:
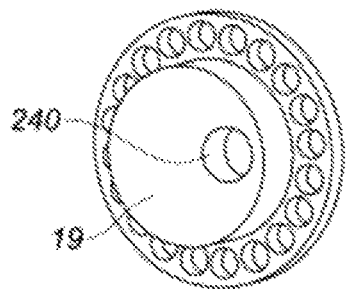

An example of an embodiment of the eccentric bearing 24 is illustrated in FIG. 14. The bearing is "eccentric" in the sense where it has an off-centre housing 240 or eccentric with respect to the axis of rotation of the bearing A24, this housing being intended to receive an end of the support axis 21. Thus, the centre of said eccentric housing 240 passing through the axis of symmetry of the housing A240 does not coincide with the centre of the bearing 24 passing through the axis of rotation of the bearing A24. It ensues that the axis of rotation of the roller 23 is eccentric with respect to the axis of rotation of the bearing 24 according to an eccentricity value such as represented by the reference "e". For example, the actual value of the eccentricity is 5/10 mm, that is an articulation of +/−1 mm.

Ends of the axis 21 of the support are each inserted in a support orifice 18 of a fixing pad 7. An eccentric bearing 24 is then applied on the outer side of the fixing pad 7 and inserted in the support orifice 18. The axis 21 of the support is thus inserted in the eccentric bearing 24 which is itself fixed to the fixing pad 7 thanks to several screws inserted through the eccentric bearing 24 in the adjustment orifices 20 of the fixing pad 7. The roller 23 rotates freely with respect to the eccentric bearings 24. In the embodiment represented in the figures, the motorised wheel 1 comprises three rotating supports 17 arranged at substantially 120° from one another.

As mentioned above, the motorised wheel 1 comprises a circular rotor 3. The circular rotor 3 comprises:
- a rim 29 extending over an outer edge 30, and
- a circular strip 45 extending over an inner edge 31.

Figure 9:
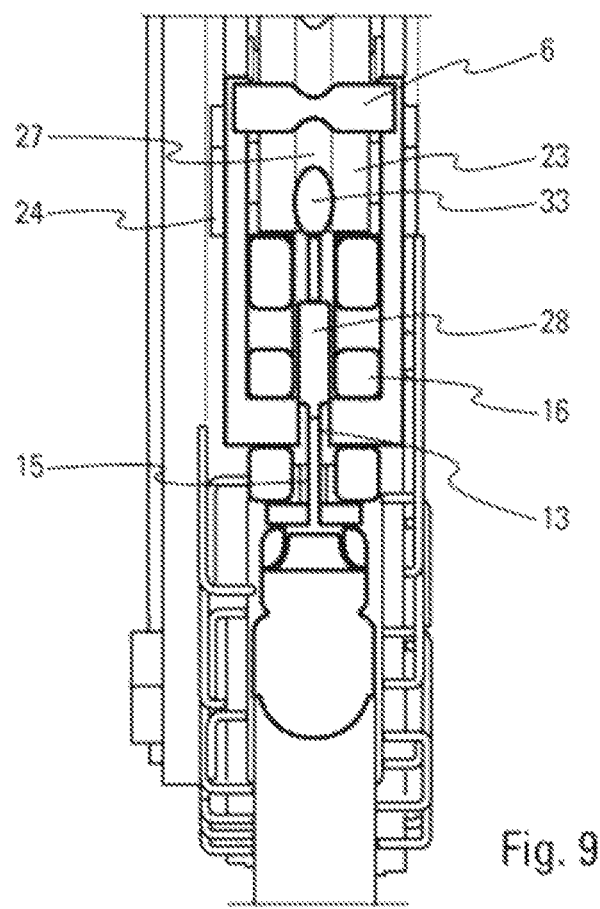
FIG. 9 is a cross-sectional view of the motorised wheel along the plane IX-IX of FIG. 1.
Figure 10:
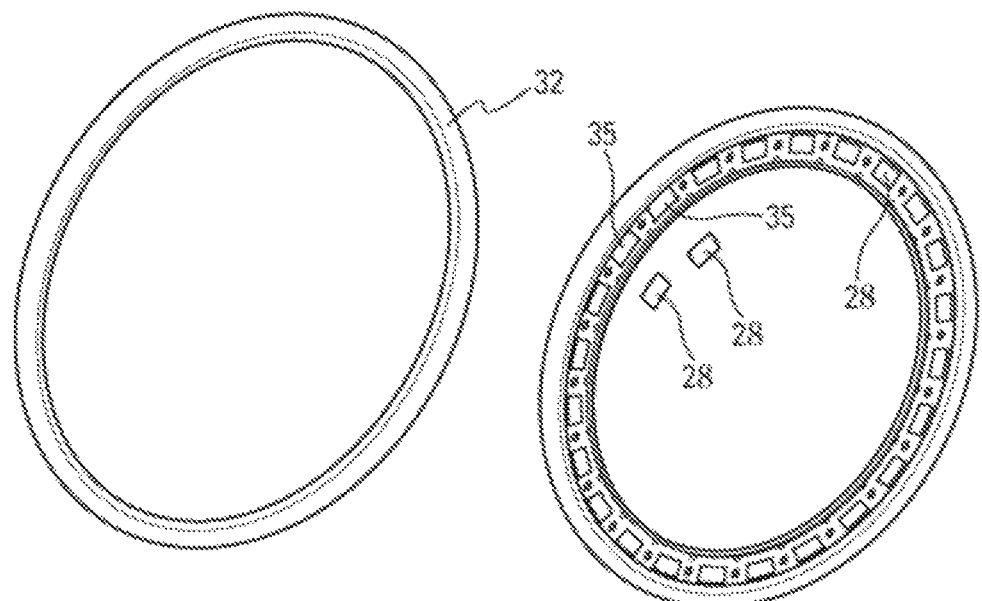
FIG. 10 is an exploded, perspective view of the rotor according to the invention.
Figure 11:
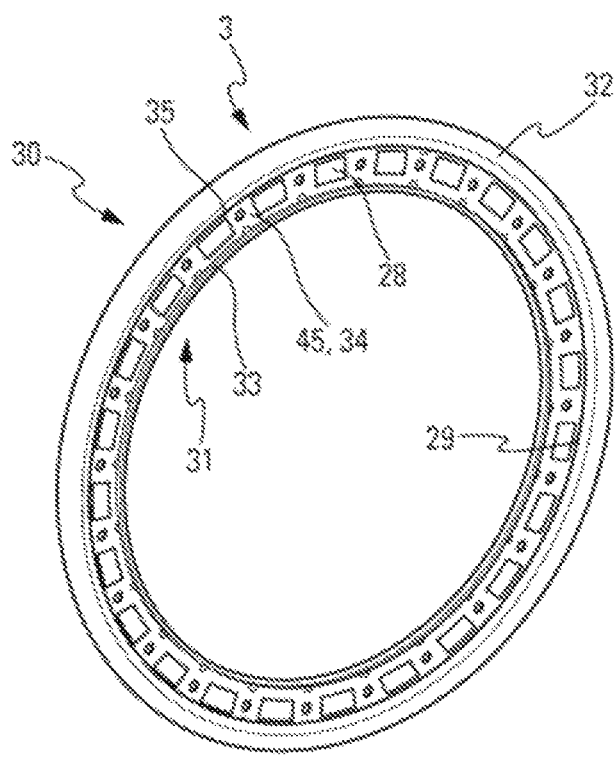
FIG. 11 is a perspective view of the rotor of FIG. 10.
Figure 12:
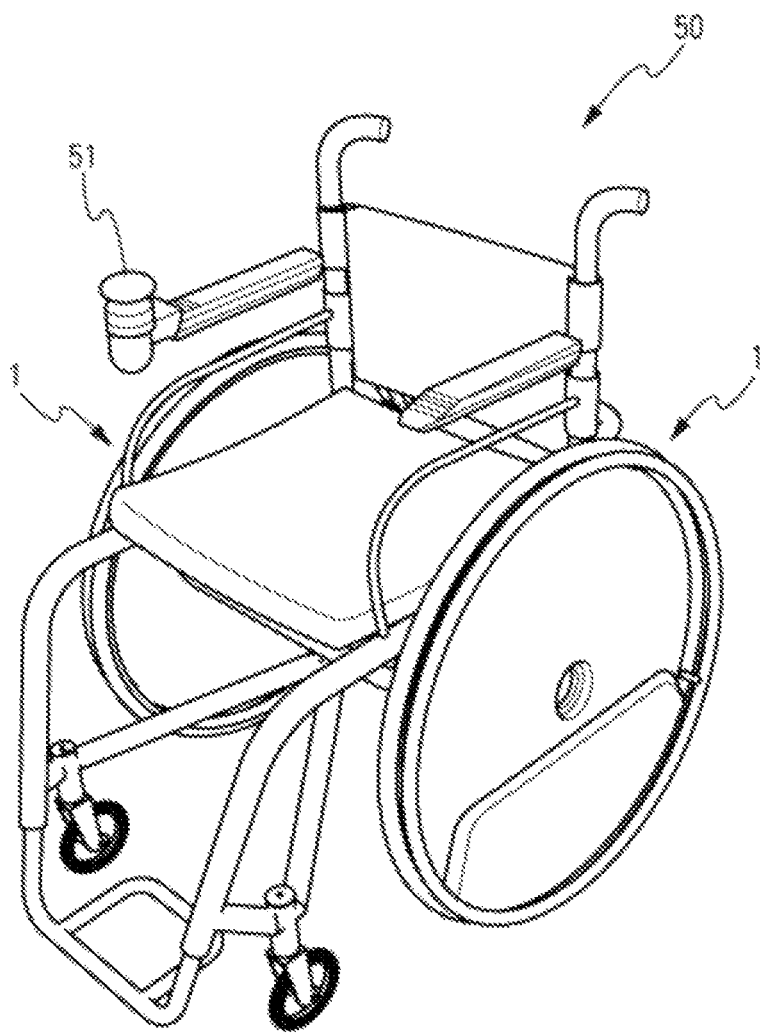
FIG. 12 is a perspective view of a wheelchair comprising a motorised wheel of the preceding figures.
Figure 17A:
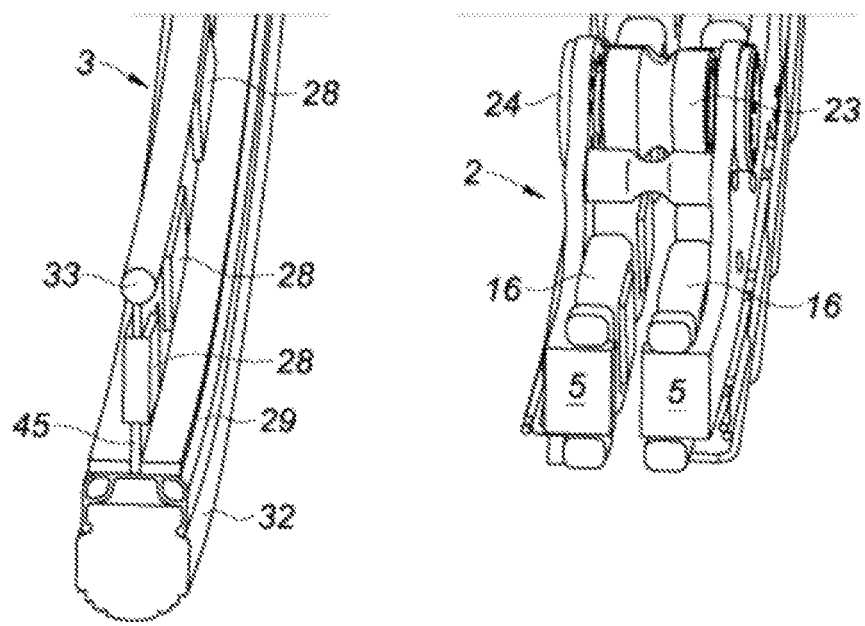
FIGS. 17 and 17b illustrate, as a perspective, the rotor and the stator separately and assembled according to a particular embodiment.
Figure 17B:
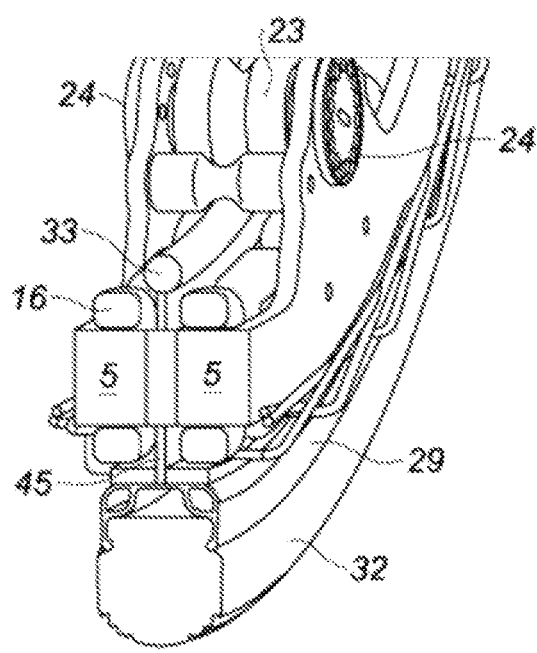

The circular rotor further comprises a tyre 32 acting as contact surface with a ground surface (not represented in the figures). For example, this tyre 32 as illustrated in FIGS. 9, 17a and 17b is intended to roll on a road, a path, a trail or any type of rolling terrain or surface on which the tyre can roll.

According to an embodiment variant (not represented), the tyre 32 can be replaced by a set of rollers distributed over the outer periphery of the rotor 3, more specifically over the contact surface with the ground so as to roll on the ground surface. For example, the rollers are those of an omnidirectional wheel without a tyre commonly called "omni-wheel" or "omnidirectional wheel".

Thus, the rotor 3 directly carries the rim 29 and the tyre 32 on the rim or any other alternative to the tyre adapted to roll on the ground surface, so that the motorised wheel can be considered as a "wheel motor", i.e. a motor wherein the rotor acts as a wheel.

Consequently, it is possible to motorise rolling vehicles by simply replacing all or some of the current wheels by at least one motorised wheel or "wheel motor" according to the present invention.

The circular strip 45 is fixed to the rim 29 by welding or gluing, for example. The circular strip 45 comprises a free end edge 33 and side walls 34. The free end edge 33 is at least partially substantially a counterpart of the groove 27 of the roller 23. The circular strip 45 is a thin, ring-shaped plate. The side walls 34 of the circular strip 45 comprise several openings 35 intended to receive magnetic elements.

The rotor 3 and the stator are assembled so that the strip of the rotor 3 is arranged in the slot 13. Thus, the magnetic elements of the rotor 3 are located between the electromagnetic coils 16 of the stator. In the embodiment represented in the figures, the rotor 3 comprises 24 magnetic elements 28. The free end edge 33 of the circular strip 45 houses in the groove 27 so that the stator bears on the three rotating supports 17. The groove 27 thus makes it possible to guide in rotation the circular strip 45, and consequently guide in rotation the circular rotor 3.

The fact that the groove 27 is at least partially substantially a counterpart of the groove 27 makes it possible to prevent the free end edge 33 from not being able to be displaced in the groove 27. The wheel is thus better guided and this moreover makes it possible to avoid a derailment of the rotor.

By positioning the fixing pads 7 over the inner periphery 8 of the half-stators, it is possible to clear a sufficiently significant space between the half-stators 5 to allow for an assembly as compact as possible of the rotor inside said stator, on the one hand, and to contribute to the reduction of the air-gap.

By positioning the rotating supports 17 over an inner periphery, and more specifically on the fixing pads 7, the assembly of the rotor and of the stator is more compact in favour of a better mechanical strength.

When the circular rotor 3 is rotated, the circular strip 45 bearing on the rotating supports 17 can rotate without difficulties.

The electromagnetic coils 16 are oriented along the wheel axis X. This means that the axis passing through the centre of the coils 16 is substantially oriented along the axis X. This makes it possible to reduce the thickness of the wheel, contrary to a different orientation.

Advantageously, the magnetic elements 28 of the rotor 3 comprise polar masses such as an iron and silicon alloy.

Preferably, the polar masses comprise a ferromagnetic alloy.

The insertion of polar masses in the rotor 3 is particularly advantageous to make the rotor electromagnetically passive, in the sense where it contains no electromagnetic source. Indeed, only the electromagnetic coils 16 arranged on the half-stators 5 are supplied by a current source.

Figure 16:
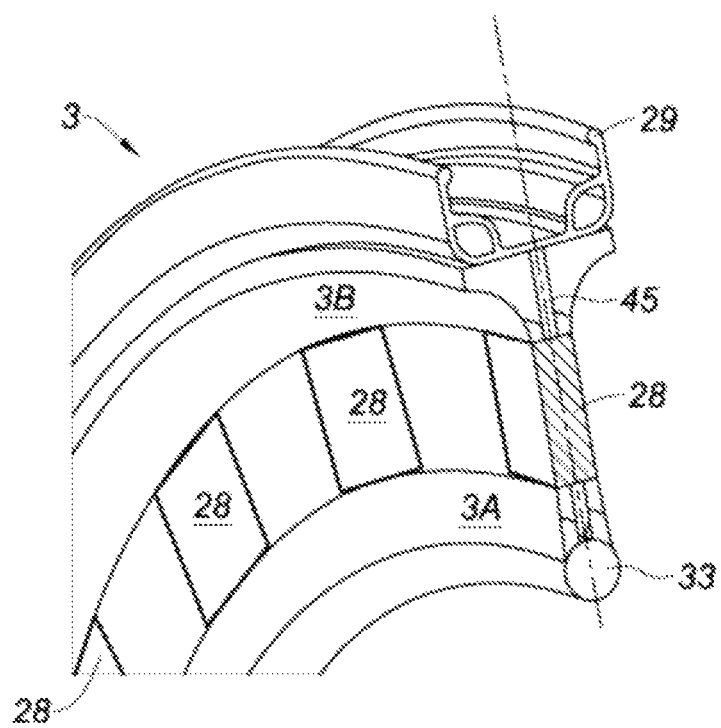
FIG. 16 illustrates, as a perspective and in a cross-section, a portion of the rotor according to a particular embodiment.

Preferably, the polar masses are arranged inside the side walls of the rotor 3, as illustrated in FIG. 16. The circular strip 45 connects the guide circlip 33 to the rim 29. For example, the circular strip 45 comprises anchoring means 35, such as slots or notches intended to fix the magnetic elements such as polar masses 28. Advantageously, these anchoring means are distributed at a regular interval over all or some of the circumference of the circular strip, so as to anchor or fix the polar masses equidistantly.

The side walls of the rotor 3 of the circular strip are constituted of a non-conductive material, such as glass fibre.

In the example of FIG. 16, the two side walls of the rotor 3 including the polar masses 28 are covered, at least partially, by a covering comprising a material which mechanical properties adapted to reinforce or rigidify the rotor 3. For example, this material is carbon fibre, to which is possibly added an epoxy-type resin. For example, this material is provided in the peripheral zones of the circular strip 45, such as designated by the references 3A and 3B in FIG. 16.

Thus, the magnetic elements 28 have no rare earths, which does not impede the manual displacement of the rotor 3 with respect to the stator 2.

It must be noted that in a variant, it is possible, all the same, to use permanent magnets without rare earths, but this choice does not constitute a preferred embodiment, since it involves a residual disruption for a manual use.

The air-gap is the distance which separates the rotor 3 from the stator. The adjustment of this distance is made using eccentric bearings 24. By displacing the eccentric bearings 24 upwards or downwards, the axis 21 of the support is inclined, which makes it possible to modify the trajectory of the circular strip 45 thanks to the action of the groove 27 of the roller 23 on the free end edge 33. The air-gap can thus be adjusted in order to increase the performances of the motorised wheel 1, in particular in order to improve its torque when stopping, and therefore to displace a significant load despite its low thickness along the axis X.

Figure 15:
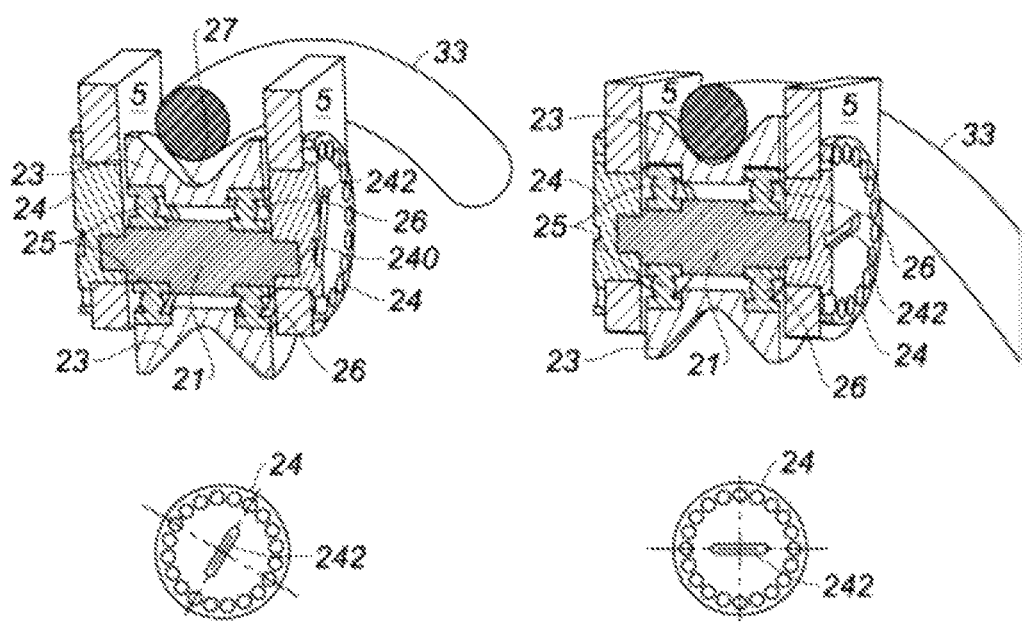
FIG. 15 represents, as a perspective, the putting into contact of the rotor with the stator by activation of the eccentric bearings.

FIG. 15 illustrates, as a perspective, the positioning of the free end 33 of the rotor 3 (i.e. rolling circlip) with respect to the groove 27 of the roller 23 of a rotating support 17 between the two half-stators 5. The position of the eccentric bearings 24, when they are engaged in the openings 18 of the half-stators 5, can be adjusted by rotation. To this end, a slot 242 is provided on the outer surface of the bearings 24 to make the eccentric bearing rotate.

Thus, the simultaneous rotation of the two bearings 24 on each half-stator 5 makes it possible to move the guide roller 23 closer to or farther away from the rolling circlip 33 of the rotor 3, thanks to the eccentric housings 240 provided on each of the eccentric bearings 24. The position of the support 21 connecting the two bearings 24 is adjusted by rotation of the bearings 24.

In the "distant" position such as represented in FIG. 15*a*, the rotor 3 is not in contact with the stator 2. The eccentric bearings 24 are in a so-called distant position. For example, this position is materialised by an oblique orientation of the slot 242.

In the "in contact" position such as represented in FIG. 15*b*, the rotor 3 is in contact with the stator 2. This position is obtained by rotation of the eccentric bearings 24 about their axis of rotation A24, such as defined in FIG. 14. For example, this so-called "in contact" position is materialised by a horizontal orientation of the slot 242. Due to the eccentricity of the housings 240, the rotation of the bearings 24 has the effect of displacing the axis 21 so that the free end 33 of the guide circlip comes into contact with the slot of the roller 23.

Thus, the rotation of the eccentric bearings 24 makes it possible to radially and axially adjust the operational clearances of the rotor 3.

FIG. 17*a* illustrates the rotor 3 and the stator 5 represented side-by-side. The rotor 3 comprising the circular strip 45 and the polar masses 28 distributed at a regular interval on the circular strip 45 by anchoring in openings 35 as described above. For reasons of clarity of representation, the polar masses 28 appear free, i.e. not covered on either side of the strip 45.

The stator 2 has a slot defined between the teeth around which the coils 16 are wound. In this embodiment, the coils 16 are wound around the teeth so that they do not exceed an extreme portion of the teeth extending towards the centre of the slot. Thus, a continuous slot of width equal to the distance separating the top of two teeth facing one another is formed.

FIG. 17b illustrates an assembly of the rotor 3 and of the stator 2 of FIG. 17a, more specifically in the case where the guide circlip 33 of the rotor 3 is in contact with the bearing 23 of the stator 2.

The motorised wheel thus comprises a central zone which can be used to house various operating and control elements of the motorised wheel 1.

The motorised wheel 1 comprises:
a microcontroller 46,
power electronics, for example a power card 47 connected to the microcontroller 46,
a battery 48 connected to the power card 47, and
a battery charger (not represented) connected to the power card 47.

Preferably, said card is an electronic power converter 47 adapted to supply the motor and control the battery charger. These two functions can be implemented within the same electronic board.

The motorised wheel 1 further comprises, an inverter, for example of 48V and 500 W to generate voltages and alternating currents.

The microcontroller is connected to a control casing 51 making it possible to give information such as the direction of movement, the rotational speed according to the desire expressed by a user. The control casing 51 can be connected to the microcontroller using a suitable cabling or wireless manner, in the latter case, the microcontroller is equipped with data transmission/reception means.

The operating principle of the motorised wheel 1 will now be described.

According to the desire expressed by the user, the microcontroller manages the supply of the electromagnetic coils 16.

The motorised wheel 1 is moved by supplying the electromagnetic coils 16 thanks to an electric current coming from the battery. The microcontroller supplies the electromagnetic coils 16 (in pairs) alternately. This alternance causes a rotation of the magnetic field and thus leads to a movement of the rotor 3 making the motorised wheel 1 advance.

Below, an example of an application of the motorised wheel will be described. As an example, two motorised wheels are mounted on a connection axis of the wheelchair. The table below summarises the operation of the motorised wheels according to the desire expressed by a user on a control casing 51 connected to the motorised wheels:

| Desire expressed | Left wheel | Right wheel | Result |
| --- | --- | --- | --- |
| Stop | Stop | Stop | Stop |
| Forward motion | Normal forward speed | Normal forward speed | Rectilinear trajectory |
| Forward-right turn | Normal forward speed | Reduced forward speed | Circular trajectory to the right |
| Forward-left turn | Reduced forward speed | Normal forward speed | Circular trajectory to the left |
| Right rotation | Reduced forward speed | Reduced backward speed | Right rotation on the spot |
| Left rotation | Reduced backward speed | Reduced forward speed | Left rotation on the spot |
| Backward-right turn | Reduced backward speed | Normal backward speed | Circular backward trajectory to the right |
| Backward-left turn | Normal backward speed | Reduced backward speed | Circular backward trajectory to the left |
| Backward motion | Normal backward speed | Normal backward speed | Rectilinear backward trajectory |

Generally, the control casing comprises a man-machine interface intended to send control signals to the motorised wheel to allow the user to control the rolling device on which the motorised wheel 1 is mounted. As an illustrative example, the control casing 51 comprises a steering wheel and/or a joystick. It can be connected to one or more sensors, such as gyroscopes, accelerometers, intended to provide information relating to the environment wherein the rolling device is displaced.

Figure 8:
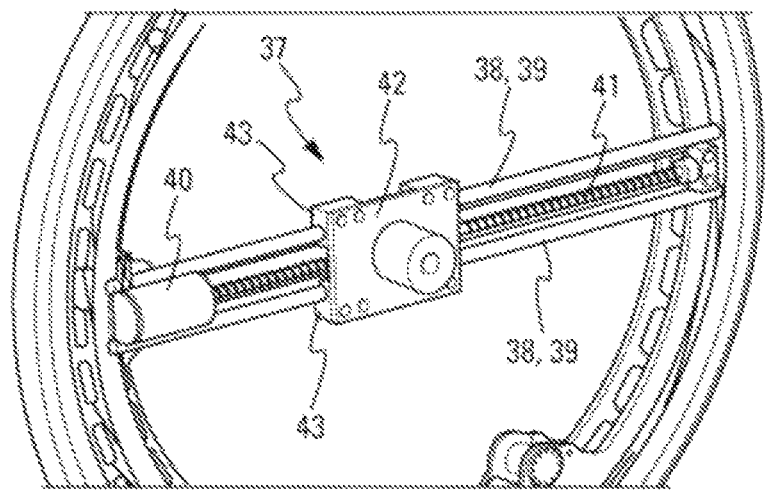
FIG. 8 is another perspective view of the motorised wheel according to the invention.

Advantageously, the motorised wheel 1 comprises a device 37 for adjusting the position of the wheel, as illustrated in FIGS. 1 and 8. More specifically, the device 37 makes it possible to adjust, in real time, the position of a fixing or anchoring point 42 of the motorised wheel 1 on the rolling device, so as to maintain an optimal holding on the ground of the rolling device according to the configuration of the ground (e.g. degree of inclination or sloping of the rolling surface). Thus, the stability of the rolling device is ensured by an improved holding on the ground, at each instant, in particular when the device is rolling on the ground surface.

The adjustment device 37 comprises a rail 38 provided with two guide rods 39 fixed on the stator. The guide rods 39 are oriented along a diameter of the stator and positioned on either side of this diameter. The guide rods 39 are substantially parallel. The device comprises an electric motor 40 mechanically coupled to a worm screw 41. The worm screw 41 is arranged between the guide rods 39. The device further comprises a fixing runner 42. The fixing runner 42 comprises a mechanical coupling interface to a connection axis.

Figure 13:
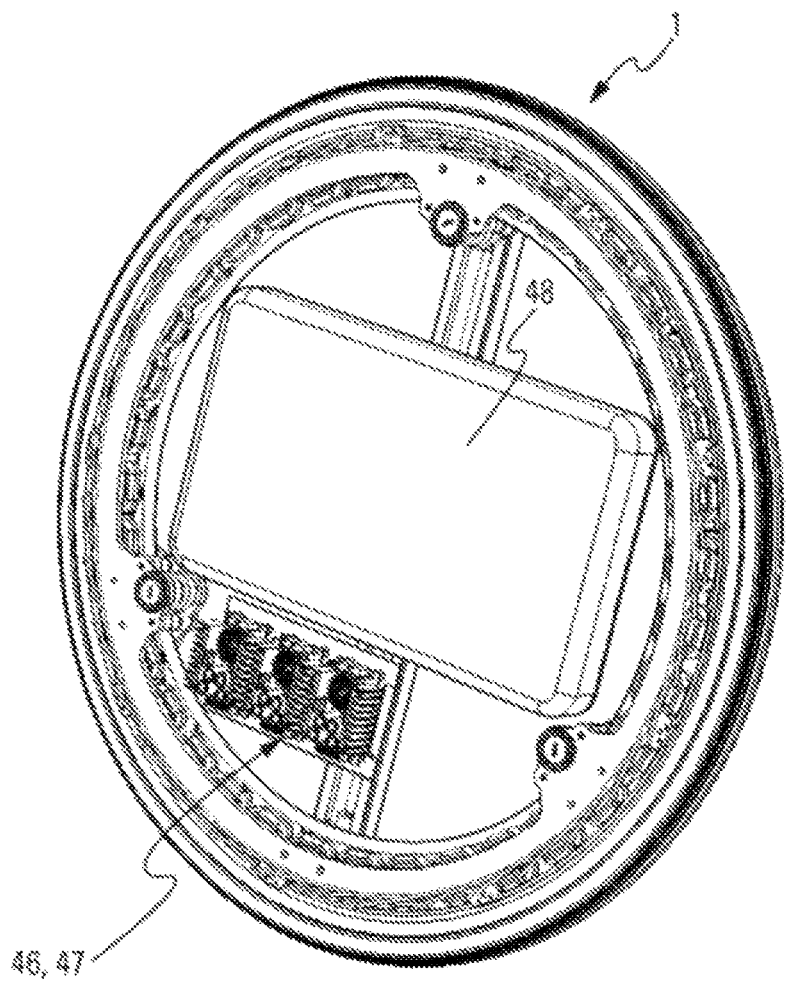
FIG. 13 is a perspective view of a motorised wheel of the preceding figures, equipped with a battery and additional electronic elements.

The use of a connection axis advantageously makes it possible to clear the space inside the wheel to install a battery and one or more electronic boards there, for example, an inductive battery charger for contactless recharging, as described in reference to FIG. 13.

The runner 42 moreover comprises guide orifices 43 intended to receive the guide rods 39 and tapped orifices 44 intended to receive threaded worm screws 41. When the worm screw 41 is rotated, the runner is displaced along guide rods. An adapted worm screw 41 is, for example, a ball screw.

Advantageously, the casing 51 comprises a tilt sensor connected to the microcontroller. The tilt sensor makes it possible to determine the base of the wheelchair 50 and thus give the necessary information to the microcontroller, such as a measurement of the base or degree of inclination of the wheelchair, so that this can act on the position of the fixing runner 42 along the worm screw 41, in the motorised wheel 1, in order to ensure a horizontal position to the user seated on the wheelchair, in all circumstances. For example, when the wheelchair is engaged on an inclined, sloped road, the microcontroller triggers the electric motor 40 in order to raise the fixing runners and hold the seat of the wheelchair in a horizontal position.

The motorised wheels are advantageously equipped with an obstacle detector, a distance detector and a GPS chip. These elements connected to the microcontroller allow the motorised wheels to join a battery recharging station autonomously in a confined place such as an apartment.

The motorised wheel described above has numerous advantages, namely:
- it develops a significant low-speed torque without consuming a lot of energy, in particular thanks to the arrangement of the circular strip 45 in the circular slot,
- it has a low thickness, suitable for a use on a wheelchair or also on a bike,
- it does not require the use of gear reducers, which considerably decreases its mass, its production cost and improves its reliability while decreasing noise in use,
- no rare earth permanent magnet is used, which makes it possible to rotate the wheel manually without difficulties, which is absolutely suitable for a wheelchair or also a bike, for example.

The present invention has been described in a detailed manner in the scope of a wheelchair, but of course, is not limited to this application. It aims, more generally, for a device intended to roll on a ground surface and comprising at least one motorised wheel such as described above.

The invention claimed is:

1. A rolling device adapted to roll on a ground surface, said device comprising at least one motorized wheel and a casing for controlling said at least one motorized wheel, said at least one motorized wheel comprising:
   a circular stator comprising a body defining a circular slot and comprising a plurality of electromagnetic coils located in the circular slot, so that at least two electromagnetic coils are arranged facing one another, and
   a circular rotor comprising over an inner periphery, a circular strip having side walls and a free end edge connecting the side walls, the circular rotor comprising a contact surface with the ground, said contact surface extending over an outer periphery, and said circular strip comprising magnetic elements arranged on its side walls,
   the circular rotor and the circular stator being assembled by means of assembly means provided on the circular stator, the circular strip of the circular rotor being arranged in the circular slot of the circular stator so that the magnetic elements of said circular strip are located between the electromagnetic coils of the circular stator.

2. The rolling device according to claim 1, wherein the body of the circular stator comprises two half-stators fixed to one another so that the circular slot is continuous.

3. The rolling device according to claim 2, wherein each half-stator comprises fixing pads capable of fixing the half-stators to one another, these fixing pads being located over the inner periphery of said half-stators.

4. The rolling device according to claim 3, wherein the assembly means called rotating supports, are arranged over the inner periphery of the circular stator.

5. The rolling device according to claim 4, wherein the rotating supports are arranged on the fixing pads (7).

6. The rolling device according to claim 4, wherein the rotating supports comprise:
   an axis,
   two ball bearings mounted on the axis, and
   a roller mounted on the ball bearings.

7. The rolling device according to claim 6, wherein the roller comprises a groove configured to receive the circular strip of the circular rotor and in that the groove is in a cross-section, at least partially, a counterpart of the free end edge.

8. The rolling device according to claim 1, wherein the magnetic elements of the circular rotor comprise an iron and silicon alloy or a ferromagnetic alloy.

9. The rolling device according to claim 1, wherein the magnetic elements of the circular rotor comprise permanent magnets without rare earths.

10. The rolling device according to claim 8, wherein the side walls of the circular strip comprise one or more openings receiving said magnetic elements.

11. The rolling device according to claim 6, further comprising adjustment means capable of modifying the inclination of the axis of the rotating supports so as to adjust a distance separating the circular rotor from the circular stator.

12. The rolling device according to claim 11, wherein the adjustment means capable of modifying the inclination of the axis of the rotating supports are two eccentric bearings forming an interface between the axis and the fixing pads, each eccentric bearing being mounted on either side of the axis.

13. The rolling device according to claim 1, further comprising a device for adjusting the position of a point for fixing said at least one motorized wheel to said rolling device, said adjustment device comprising means for fixing to a connection axis.

14. The rolling device according to claim 13, wherein the device for adjusting the position of the fixing point of said at least one motorized wheel comprises:
   substantially parallel guide rods fixed to the circular stator,
   an electric motor,
   a worm screw coupled with the electric motor,
   a fixing runner comprising means for fixing to the connection axis, said fixing runner being mechanically coupled with the worm screw and with the guide rods so that the rotation of the worm screw allows for the displacement of the fixing runner along the guide rods.

15. The rolling device according to claim 1, further comprising:
   a microcontroller,
   a power card connected to the microcontroller,
   a battery connected to the power card,
   a battery charger capable of charging the battery, and in that a computer program is implemented in the microcontroller, said microcontroller being capable of successively supplying the electromagnetic coils of the circular stator to allow for the rotation of the circular rotor.

16. The rolling device according to claim 1, wherein the rotor further comprises a tire or a set of rollers distributed over the outer periphery of the rotor acting as a contact surface with the ground.

17. The rolling device according to claim 1, wherein the control casing comprises a tilt sensor connected to the microcontroller, the tilt sensor being capable of measuring the base of the rolling device and of providing this measurement to the microcontroller so that said microcontroller modifies the position of the fixing point of said at least one motorized wheel by actuating the electric motor of the device for adjusting the position of the fixing point of said at least one motorized wheel.

18. The rolling device according to claim 1, wherein the rotor comprises a rim extending over an outer edge and in that the circular strip connects the free end edge to said rim.

19. The rolling device according to claim 1, wherein the walls of the strip are reinforced at least at the level of its ends by a carbon fiber covering comprising an epoxy-type resin.

* * * * *